April 21, 1942.  V. W. EMBREE ET AL  2,280,694
VEHICLE PASSENGER SAFETY DEVICE
Filed May 23, 1940  2 Sheets-Sheet 1
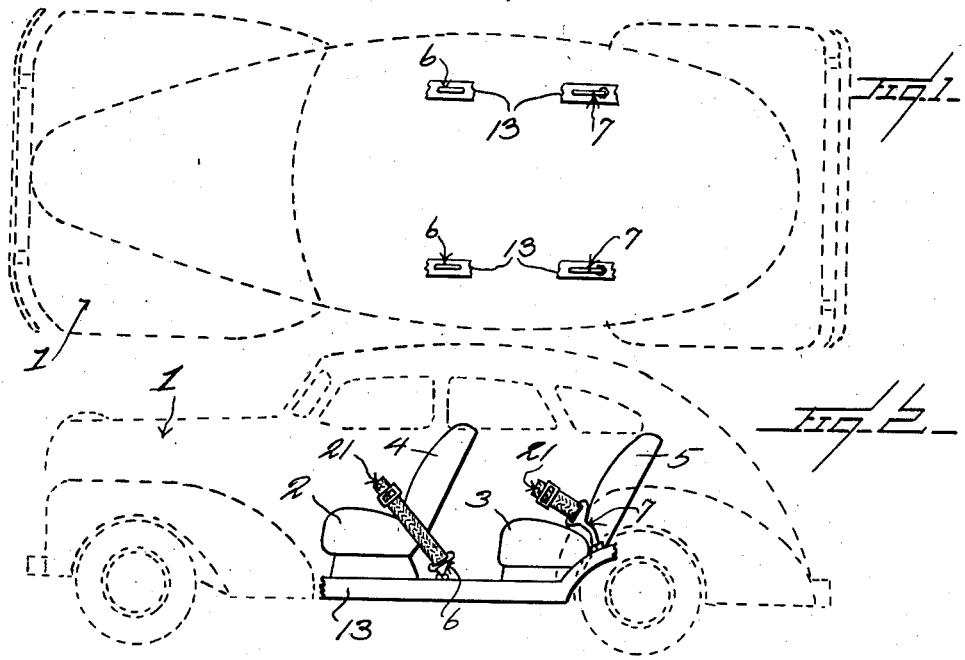
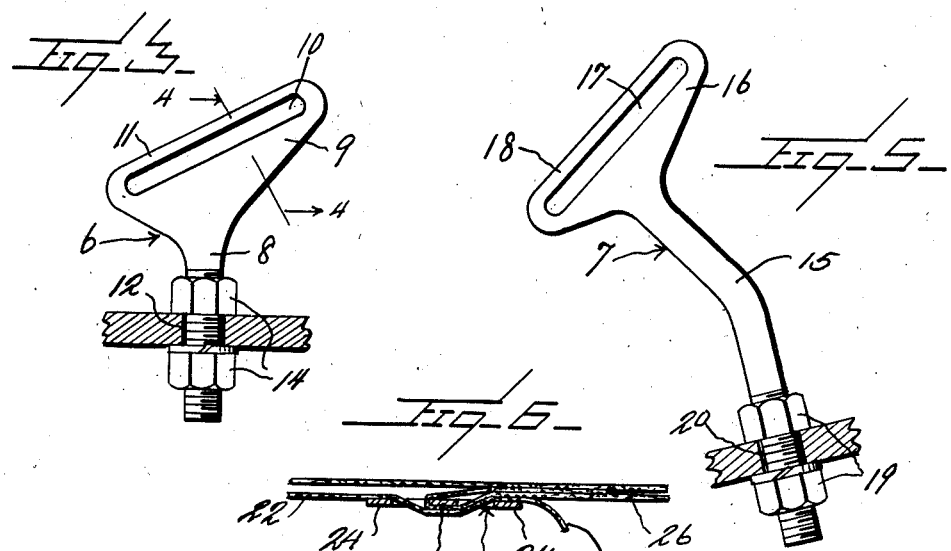
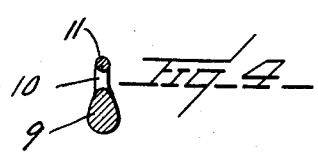
Inventors
V. W. Embree
+ L. F. Embree
By Watson E. Coleman
Attorney

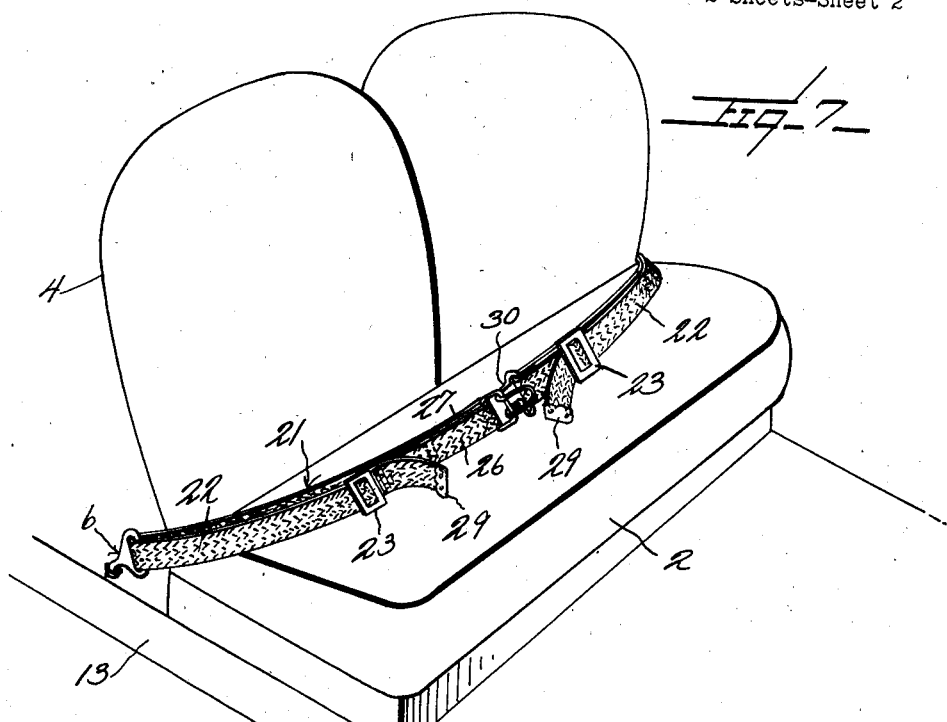
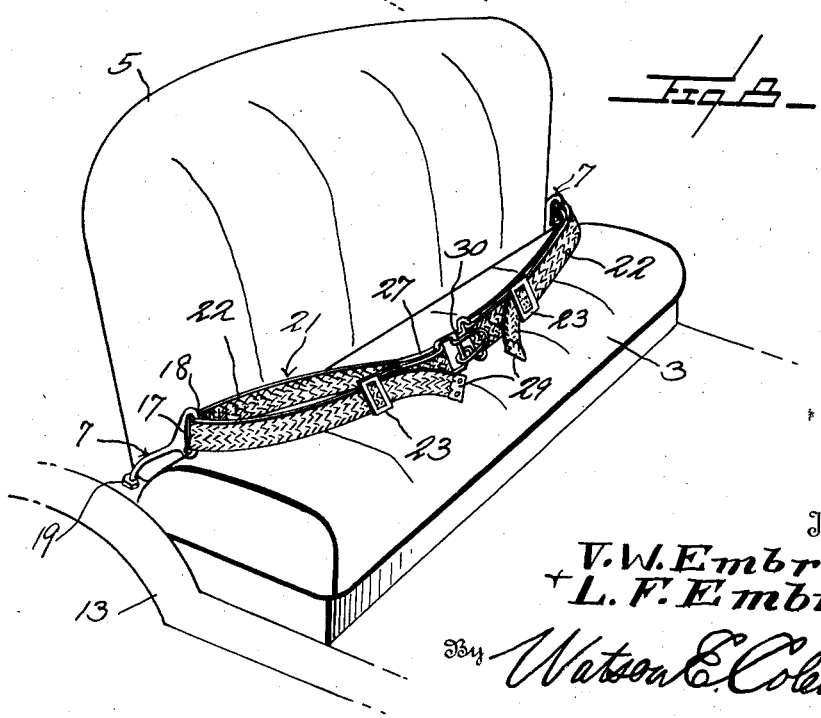

Patented Apr. 21, 1942

2,280,694

UNITED STATES PATENT OFFICE 2,280,694

VEHICLE PASSENGER SAFETY DEVICE

Vern W. Embree and Leland F. Embree,
Onida, S. Dak.

Application May 23, 1940, Serial No. 336,828

3 Claims. (Cl. 85—1)

This invention relates to improvements in safety devices for use upon motor vehicles such as pleasure vehicles, buses and the like, and pertains particularly to devices for holding the occupants of the vehicles in their seats in the event of accident or sudden stopping of the vehicle.

It frequently occurs in the driving of motor vehicles that very quick stops are required to avoid accident, as a result of which the occupants of the vehicle are suddenly thrown forward and are frequently injured by being thrown against the windshield, the back of the front seat or some other part of the vehicle and injury in this manner is particularly likely to occur in the event of collision.

The present invention has for its primary object to provide a safety securing means for the occupants of a vehicle such as a bus or a pleasure vehicle by means of which the occupants are held securely in their seats and cannot be thrown forward in the event that the vehicle is stopped quickly.

Another object of the invention is to provide an improved safety means of the character stated which comprises a safety belt designed to be secured across the hips and lower abdomen of the occupant of the vehicle and a novel means for attaching the strap to the body of the vehicle so that the strap will be firmly held and will not give way or yield at its point of attachment with the vehicle body or frame.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in plan of a motor vehicle shown in dotted outline and showing the location of the strap securing brackets forming a part of the present invention.

Fig. 2 illustrates the vehicle in side elevation showing the manner in which the strap attaching brackets are attached to the chassis frame.

Fig. 3 is a detailed side elevation of one of the pair of front seat strap brackets.

Fig. 4 is a sectional view on the line 4—4 of Fig. 3.

Fig. 5 is a view in side elevation of one of the pair of rear seat strap attaching brackets.

Fig. 6 is a sectional view through a portion of a slide buckle used for joining the ends of a strap section.

Fig. 7 is a view in perspective illustrating the application of the safety strap to the front seat of a vehicle.

Fig. 8 is a view in perspective illustrating the application of the strap to the rear seat of a vehicle.

Referring now more particularly to the drawings, the numeral 1 designates a motor vehicle of the pleasure type, the same being shown in dotted outline while the numerals 2 and 3 designate respectively the front and rear seats for the vehicle, the backs for such seats being indicated respectively by the numerals 4 and 5.

In carrying out the present invention there is provided a pair of strap securing brackets for use in association with the front seat 2, which brackets are indicated by the numeral 6 and a somewhat similarly formed pair of strap securing brackets is used in association with the rear seat 3 and each of these brackets is indicated by the numeral 7.

The brackets 6 each consists of a relatively short post or shank 8 which at its upper end is shaped to provide the transversely extending relatively long head 9 which is disposed obliquely to the length of the shank and is provided with the elongated slot 10 which also extends obliquely to the shank, as shown. This head is tapered from a relatively thick form at its lower side to a thinner form or width along its free longitudinal edge so that the portion lying above the slot 10 and constituting a bar 11 may be substantially circular in cross-section, as shown in Fig. 4.

The shank 8 is screw threaded as shown, and is adapted to be extended through a suitable aperture 12 formed in the chassis frame 13 adjacent the rear of the front seat and each of the front seat brackets 6 is held in place by the upper and lower securing nuts 14 with the length of the head 9 directed longitudinally of the vehicle and upwardly and rearwardly, as shown in Fig. 2.

Each of the rear seat brackets 7 also has a shank portion which is indicated by the numeral 15, but these shanks are materially longer than the shanks 8 of the front seat brackets and are slightly angled as shown in Fig. 5. Upon the upper end of each rear seat bracket shank 15 is a head 16 which is of substantially the same form as the head 9, being directed obliquely of the shank and provided with a longitudinal slot 17 and the strap holding bar portion 18 which forms the part of the head lying above the slot.

The lower ends of the shanks 15 of the rear seat brackets are screw threaded to receive the securing nuts 19 when this threaded portion of the bracket is extended through an aperture 20 in the chassis frame 13 adjacent the rear part of the rear seat 3, as shown in Fig. 2. The shanks of the rear seat brackets are made long so as to extend from the chassis up between the back of the rear seat and the adjacent wall of the vehicle to locate the head 16 near the front side or face of the back 5, as shown in Fig. 2. This brings the heads of the rear seat brackets in a position where they may be easily accessible for the attachment thereto of the safety straps about to be described whereas in connection with the front seat brackets, it is not necessary that the heads thereof extend forwardly from the backs 4 as such brackets can be easily reached for the attachment of the straps thereto when disposed behind the front seat, as shown in Fig. 2.

Each pair of front seat brackets and each pair of rear seat brackets has attached thereto a two-part or two-section safety strap which is indicated as a whole by the numeral 21. These straps for the front and rear seat brackets are of duplicate construction. Each of the straps 21 comprises the two sections 22 of strap material or webbing such as is used for making straps and the two ends of each section 22 are connected by a slide buckle 23 which, as shown in Fig. 6, has two outer bars 24 and an intermediate bar 25. The intermediate or center bar 25 has an end of the strap section 22 passed thereabout, as shown in Fig. 6, and this end is secured between adjacent parts of the web at 26, thus forming a loop 27.

The free end 28 of each portion is then passed through a bracket slot, as shown in Figs. 7 and 8, and is brought back and passed through the slide buckle 24 in the manner illustrated in Fig. 6. Each of the ends 24 is preferably secured in a protecting shield of metal or other suitable material, as indicated at 29 in Figs. 7 and 8.

The loops 27 of the two strap sections are connected to the parts of a quick releasing buckle which is indicated generally by the numeral 30 and by means of which the two portions of the safety strap 21 are joined together across the laps of occupants of the seat over which the strap lies. From the foregoing, it will be readily apparent that there is here provided a vehicle seat safety strap or safety device which may be installed in a motor vehicle without difficulty and without necessitating the making of any changes or alterations in the vehicle body structure. It will be readily apparent that after the person takes his seat, the two portions of the buckle 30 will be connected together across the hips and lower abdomen of the occupant and since the other ends of the two sections are firmly attached to the chassis frame of the vehicle by means of the brackets at the sides of the seat, the occupant of the seat will be securely held in position in the event that the vehicle makes any sudden movement as by stopping or backing quickly which would tend to throw the occupant forward from the seat.

What is claimed is:

1. A strap securing bolt of the character stated comprising a shank having a threaded portion for the reception of securing nuts, a head portion connected with said shank, said head portion being relatively long and being disposed to have its length extend obliquely with respect to the length of the shank, said head portion having a slot therein and extending lengthwise thereof for the reception of a strap, belt or the like.

2. A bolt device of the character stated comprising a shank portion, said shank being screw threaded to receive securing nuts, a relatively long plate secured at one side intermediate its ends to said shank and extending obliquely with respect to the length of the shank, the connecting portion between the plate and the shank being of gradually increasing width from the shank to the plate to provide a wide reenforced area, said plate having a slot cut therethrough and extending lengthwise thereof to receive a strap, belt or the like.

3. A device of the character set forth in claim 2 in which said shank is bent intermediate its ends to form an obtuse angle.

VERN W. EMBREE.
LELAND F. EMBREE.